US011817005B2

(12) United States Patent
Monge Nunez

(10) Patent No.: US 11,817,005 B2
(45) Date of Patent: *Nov. 14, 2023

(54) INTERNET OF THINGS PUBLIC SPEAKING COACH

(71) Applicant: International Business Machines Corporation, Armonk, NY (US)

(72) Inventor: Roxana Monge Nunez, San Jose (CR)

(73) Assignee: International Business Machines Corporation, Armonk, NY (US)

( * ) Notice: Subject to any disclaimer, the term of this patent is extended or adjusted under 35 U.S.C. 154(b) by 1158 days.

This patent is subject to a terminal disclaimer.

(21) Appl. No.: 16/176,551

(22) Filed: Oct. 31, 2018

(65) Prior Publication Data

US 2020/0135050 A1    Apr. 30, 2020

(51) Int. Cl.
*G09B 19/04* (2006.01)
*G10L 25/60* (2013.01)
(Continued)

(52) U.S. Cl.
CPC .............. *G09B 19/04* (2013.01); *G06N 20/00* (2019.01); *G10L 15/22* (2013.01); *G10L 25/60* (2013.01); *G10L 25/63* (2013.01); *G10L 25/90* (2013.01)

(58) Field of Classification Search
CPC ........ G09B 19/04; G06N 20/00; G10L 15/22; G10L 25/60; G10L 25/63; G10L 25/90; G10L 15/26; G10L 25/48
See application file for complete search history.

(56) References Cited

U.S. PATENT DOCUMENTS 6,923,652 B2    8/2005   Kerns et al.
7,818,179 B2   10/2010   Krasikov et al.
(Continued)

OTHER PUBLICATIONS

Schneider, Jan, et al. ("Presentation trainer, your public speaking multimodal coach." Proceedings of the 2015 ACM on International Conference on Multimodal Interaction. 2015 .; https://dl.acm.org/doi/abs/10.1145/2818346.2830603; hereinafter referred to as Schneider et al. (Year: 2015).*

(Continued)

*Primary Examiner* — Pierre Louis Desir
*Assistant Examiner* — Keisha Y. Castillo-Torres
(74) *Attorney, Agent, or Firm* — Rakesh Roy; Madeline F. Schiesser; Keohane & D'Alessandro, PLLC

(57) ABSTRACT

Approaches presented herein enable delivery of real-time internet of things (IoT) feedback to optimize a public speaking performance. More specifically, a set of data representing a speaking performance of a user is captured and analyzed to generate a speaking performance profile of the user. This profile is compared to a reference speaking performance profile and, based on the comparison, a set of performance improvement strategies for the user is generated. A performance improvement strategy is selected from the set of performance improvement strategies based on an identification of an availability of a set of IoT devices for delivery of at least one of the strategies. Instructions are then communicated, responsive to the captured speaking performance associated with the user, to an available IoT device to deliver the selected performance improvement strategy to the user through an output user interface of the available IoT device during the speaking performance.

20 Claims, 5 Drawing Sheets

(51) Int. Cl.
  *G10L 25/63* (2013.01)
  *G10L 25/90* (2013.01)
  *G10L 15/22* (2006.01)
  *G06N 20/00* (2019.01)

(56) References Cited

U.S. PATENT DOCUMENTS

| | | | |
|---|---|---|---|
| 7,941,318 B2 | 5/2011 | Lu | |
| 9,691,296 B2* | 6/2017 | Hoque | G09B 5/065 |
| 9,792,908 B1* | 10/2017 | Bassemir | G09B 19/04 |
| 10,614,828 B1 | 4/2020 | Cowburn et al. | |
| 11,163,965 B2* | 11/2021 | Monge Nunez | G06F 40/279 |
| 2010/0278377 A1 | 11/2010 | Hamel et al. | |
| 2014/0191939 A1 | 7/2014 | Penn et al. | |
| 2014/0278455 A1 | 9/2014 | Chandrasekaran et al. | |
| 2016/0049094 A1* | 2/2016 | Gupta | G09B 7/02 434/185 |
| 2016/0063874 A1* | 3/2016 | Czerwinski | G16H 50/20 434/236 |
| 2016/0224803 A1 | 8/2016 | Frank et al. | |
| 2017/0026514 A1 | 1/2017 | Dwyer et al. | |
| 2017/0084295 A1* | 3/2017 | Tsiartas | G10L 17/08 |
| 2017/0134803 A1* | 5/2017 | Shaw | H04N 21/234363 |
| 2017/0169727 A1 | 6/2017 | Briggs et al. | |
| 2019/0050774 A1 | 2/2019 | Devine et al. | |
| 2019/0348063 A1* | 11/2019 | Vaculin | G10L 17/24 |
| 2020/0226217 A1 | 7/2020 | Anders et al. | |
| 2020/0344192 A1 | 10/2020 | Conley et al. | |
| 2020/0401794 A1 | 12/2020 | Ishii et al. | |

OTHER PUBLICATIONS

Khazan, Olga, "This App Reads Your Emotions on Your Face", The Atlantic, Jan. 15, 2014, 7 pgs.
"Nonverbal communication", Wikipedia, Jul. 25, 2018, 21 pgs.
Feloni, Richard, "7 Bad Speaking Habits That Turn People Off", Business Insider, Jul. 7, 2014, 7 pgs.
Dickey, Megan Rose, "SpeechCoach.ai helps you step up your public speaking game", TechCrunch, Sep. 2017, 8 pgs.
Chollet, Mathieu et al., "An Interactive Virtual Audience Platform for Public Speaking Training", www.toastmasters.org, May 5, 2014, 2 pgs.
Schneider, Jan et al., "Presentation Trainer: What experts and computers can tell about your nonverbal communication", My APA Document, Jan. 22, 2017, 32 pgs.
"Tone Analyzer", IBM Watson Developer Cloud, Wayback Machine, https://web.archive.org/web/20181023033425/https://tone-analyzer-demo.ng.bluemix.net/, Oct. 23, 2018, 2 pgs.
Appendix P, "List of IBM Patents or Patent Applications Treated as Related", 2 pages.
Wong, Linda, U.S. Appl. No. 16/599,613, Notice of Allowance and Fees Due, dated Jun. 30, 2021, 16 pgs.

* cited by examiner

US 11,817,005 B2

INTERNET OF THINGS PUBLIC SPEAKING COACH

TECHNICAL FIELD

The present invention relates generally to an internet of things (IoT) network and, more specifically, to improving a spoken presentation of a user in real time using IoT feedback.

BACKGROUND

The use of smart devices and other devices linked in an IoT network have become increasingly popular within and around a user's environment. The IoT network formed by these devices is generally a network that combines physical electronic devices with software, enabling these devices to form a connective network among themselves for the exchange of data. Each IoT device can be recognized as a separate computing system, but can also operate within the infrastructure of the IoT network. Some IoT devices may also have, for example, sensors for monitoring or actuators for performing tasks in the physical world. More specifically, the term "things" in IoT can refer to any of a wide variety of devices, from "smart" thermostats to "wearable" electronics. IoT devices and the IoT network formed therefrom can offer, among other things, a combination of hardware, software, data generation, and service performance that integrate computer systems into the physical world. This can permit a minimization of human intervention in areas traditionally requiring such, as well as greater efficiency and accuracy of systems under the control of one or more devices in an IoT environment.

SUMMARY

Approaches presented herein enable delivery of real-time internet of things (IoT) feedback to optimize a public speaking performance. More specifically, a set of data representing a speaking performance of a user is captured and analyzed to generate a speaking performance profile of the user. This profile is compared to a reference speaking performance profile and, based on the comparison, a set of performance improvement strategies for the user is generated. A performance improvement strategy is selected from the set of performance improvement strategies based on an identification of an availability of a set of IoT devices for delivery of at least one of the strategies. Instructions are then communicated, responsive to the captured speaking performance associated with the user, to an available IoT device to deliver the selected performance improvement strategy to the user through an output user interface of the available IoT device during the speaking performance.

One aspect of the present invention includes a method for improving a spoken presentation of a user in real time using internet of things (IoT) feedback, the method comprising: capturing a set of data representative of a speaking performance associated with a user; analyzing the captured data by assigning a set of values to a verbal element of the speaking performance of the user, a non-verbal element of the speaking performance of the user, and a paralanguage element of the speaking performance of the user, to generate a speaking performance profile of the user; comparing the speaking performance profile of the user to a reference speaking performance profile having a set of values that indicate an optimal verbal speaking performance, non-verbal speaking performance, and paralanguage speaking performance for the user; generating, based on the comparison, a set of performance improvement strategies for the user; selecting a performance improvement strategy from the set of performance improvement strategies based on an identification of an availability of a set of IoT devices for delivery of at least one of the set of performance improvement strategies; and communicating, responsive to the captured speaking performance associated with the user, instructions to deliver the selected performance improvement strategy to the user through an output user interface of the available IoT device during the speaking performance.

Another aspect of the present invention includes a computer system for improving a spoken presentation of a user in real time using internet of things (IoT) feedback, the computer system comprising: a memory medium comprising program instructions; a bus coupled to the memory medium; and a processor, for executing the program instructions, coupled to an IoT public speaking coach engine via the bus that when executing the program instructions causes the system to: capture a set of data representative of a speaking performance associated with a user; analyze the captured data by assigning a set of values to a verbal element of the speaking performance of the user, a non-verbal element of the speaking performance of the user, and a paralanguage element of the speaking performance of the user, to generate a speaking performance profile of the user; compare the speaking performance profile of the user to a reference speaking performance profile having a set of values that indicate an optimal verbal speaking performance, non-verbal speaking performance, and paralanguage speaking performance for the user; generate, based on the comparison, a set of performance improvement strategies for the user; select a performance improvement strategy from the set of performance improvement strategies based on an identification of an availability of a set of IoT devices for delivery of at least one of the set of performance improvement strategies; and communicate, responsive to the captured speaking performance associated with the user, instructions to deliver the selected performance improvement strategy to the user through an output user interface of the available IoT device during the speaking performance.

Yet another aspect of the present invention includes a computer program product for improving a spoken presentation of a user in real time using internet of things (IoT) feedback, the computer program product comprising a computer readable hardware storage device, and program instructions stored on the computer readable hardware storage device, to: capture a set of data representative of a speaking performance associated with a user; analyze the captured data by assigning a set of values to a verbal element of the speaking performance of the user, a non-verbal element of the speaking performance of the user, and a paralanguage element of the speaking performance of the user, to generate a speaking performance profile of the user; compare the speaking performance profile of the user to a reference speaking performance profile having a set of values that indicate an optimal verbal speaking performance, non-verbal speaking performance, and paralanguage speaking performance for the user; generate, based on the comparison, a set of performance improvement strategies for the user; select a performance improvement strategy from the set of performance improvement strategies based on an identification of an availability of a set of IoT devices for delivery of at least one of the set of performance improvement strategies; and communicate, responsive to the captured speaking performance associated with the user, instructions to deliver the selected performance improvement strategy to the user through an output user interface of the available IoT device during the speaking performance.

Still yet, any of the components of the present invention could be deployed, managed, serviced, etc., by a service provider who offers to implement passive monitoring in a computer system.

Embodiments of the present invention also provide related systems, methods, and/or program products.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
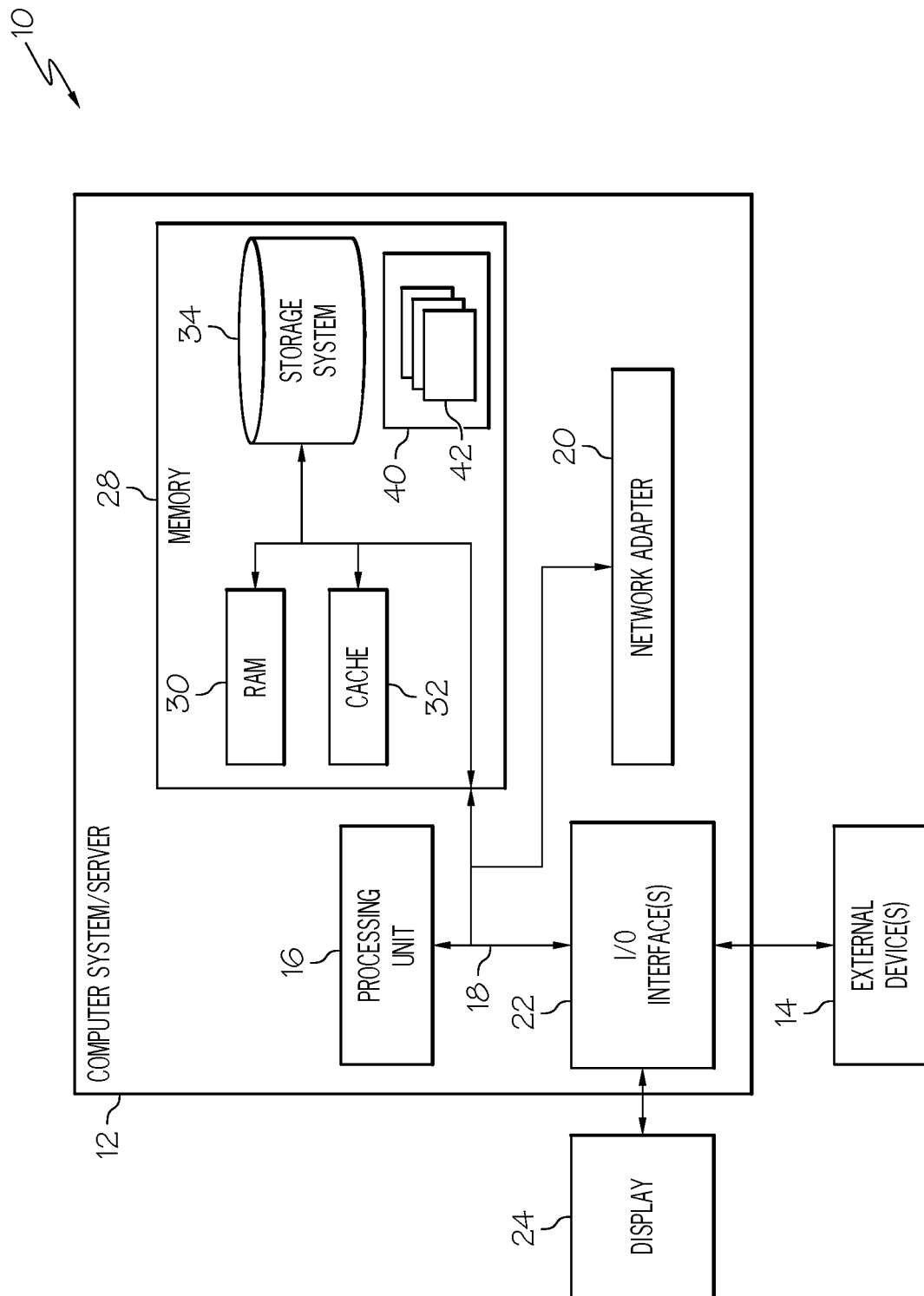
FIG. 1 shows an architecture in which the invention may be implemented according to illustrative embodiments.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "detecting," "determining," "evaluating," "receiving," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

As stated above, embodiments described herein provide for delivery of real-time internet of things (IoT) feedback to optimize a public speaking performance. More specifically, a set of data representing a speaking performance of a user is captured and analyzed to generate a speaking performance profile of the user. This profile is compared to a reference speaking performance profile and, based on the comparison, a set of performance improvement strategies for the user is generated. A performance improvement strategy is selected from the set of performance improvement strategies based on an identification of an availability of a set of IoT devices for delivery of at least one of the strategies. Instructions are then communicated, responsive to the captured speaking performance associated with the user, to an available IoT device to deliver the selected performance improvement strategy to the user through an output user interface of the available IoT device during the speaking performance.

Referring now to FIG. 1, a computerized implementation 10 of an embodiment for improving a spoken presentation of a user in real time using IoT feedback will be shown and described. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system/server 12 is intended to demonstrate that some or all of the components of implementation 10 could be deployed, managed, serviced, etc., by a service provider who offers to implement, deploy, and/or perform the functions of the present invention for others.

Computer system/server 12 is intended to represent any type of computer system that may be implemented in deploying/realizing the teachings recited herein. Computer system/server 12 may be described in the general context of computer system/server executable instructions, such as program modules, being executed by a computer system. Generally, program modules may include routines, programs, objects, components, logic, data structures, and so on, that perform particular tasks or implement particular abstract data types. In this particular example, computer system/server 12 represents an illustrative system for improving a spoken presentation of a user in real time using IoT feedback. It should be understood that any other computers implemented under the present invention may have different components/software, but can perform similar functions.

Computer system/server 12 in computerized implementation 10 is shown in the form of a general-purpose computing device. The components of computer system/server 12 may include, but are not limited to, one or more processors or processing units 16, a system memory 28, and a bus 18 that couples various system components including system memory 28 to processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as program code for improving a spoken presentation of a user in real time using IoT feedback, which is stored in memory 28, storage system 34, and/or program/utility 40. While executing computer program code, processing unit 16 can read and/or write data to/from memory 28, storage system 34, and program/utility 40.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

The inventors of the present invention have found that delivering speaking performance improvement feedback in real time to a public speaker without negatively interfering with his or her ongoing public speaking performance can be challenging. A public speaker may find hand waving or other attention-drawing feedback distracting and confusing, lacking a clear sense of what element of his or her speaking performance requires improvement or what he or she should actually do to improve that speaking performance. Moreover, public speaking is a common challenge for many people, demanding skills in verbal, non-verbal and paralanguage communication, which are not easy to achieve. It can be particularly difficult to determine which of these skills requires improvement, and to then deliver training specific to that skill without harming any other. Conveying nuances, such as instructions to alter not spoken words themselves, but rather how they are spoken, generally requires a review of the speaking performance after the fact, with a detailed debriefing on performance strengths and weaknesses. In situations where the speaker is addressing a live audience, such post-speech instructions would come too late.

Accordingly, the inventors of the present invention have developed a system that learns a user's verbal, non-verbal, and paralanguage public speaking performance behaviors (e.g., gestures, posture, etc.) and, based on these learned behaviors, discreetly conveys recommended ameliorative actions to the user through actuators or other user interfaces of one or more IoT devices in real time, concurrent with the public speaking performance. Furthermore, embodiments of the present invention offer techniques for optimizing IoT speaking performance improvement strategies based on such learning, an audience and other ambient conditions, and available IoT devices.

Furthermore, embodiments of the present invention offer several advantages to IoT technology. Whereas personal devices can often be a source of poor communication between people, due to offering distractions and interrupting normal speech and conversation, embodiments of the present invention permit IoT devices to seamlessly communicate information to a person while he or she is in the midst of a speaking performance, without interrupting or detracting from that speaking performance. Furthermore, embodiments of the present invention provide IoT devices with the ability to provide coaching and feedback in real time during a speaking performance.

Figure 2:
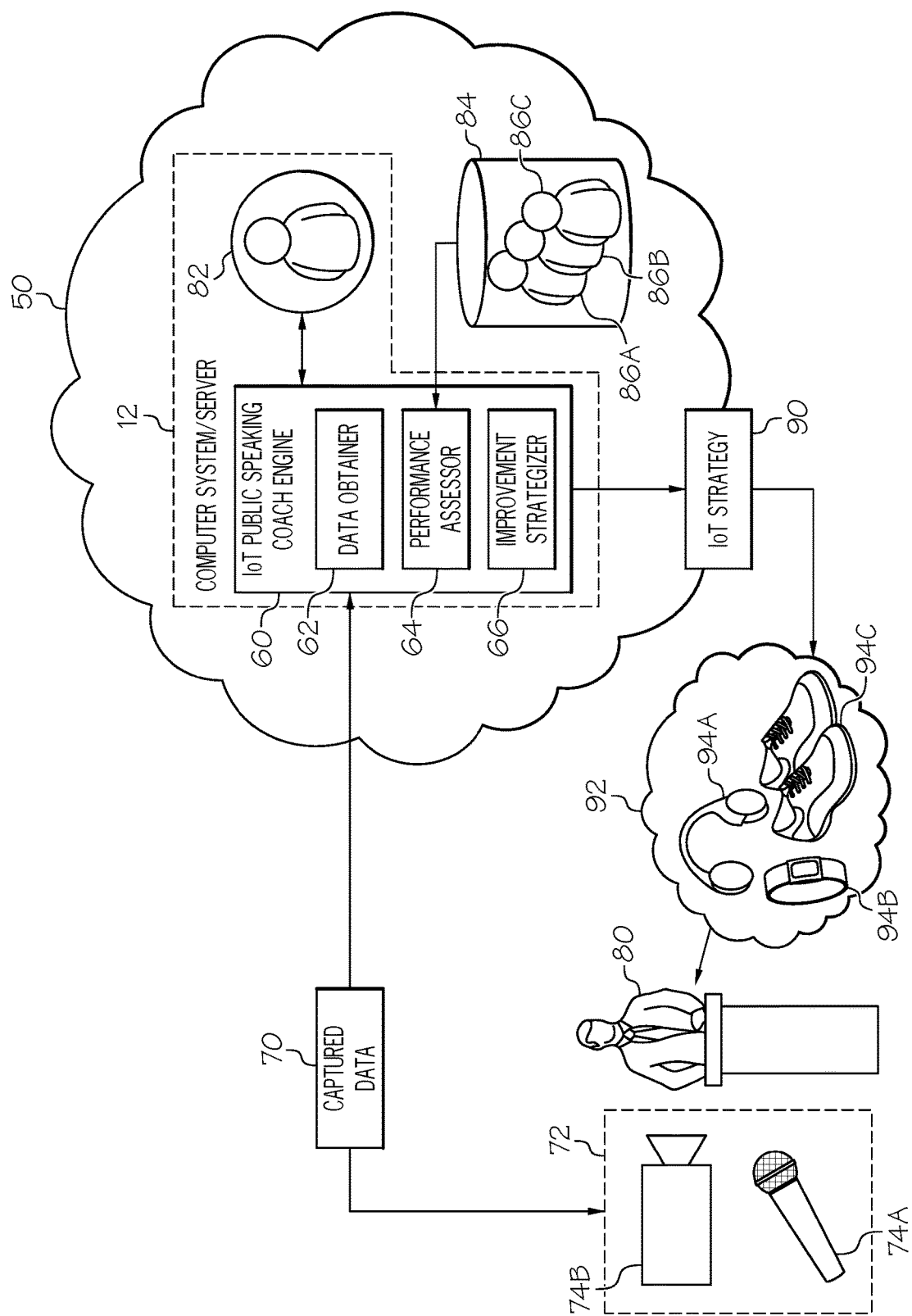
FIG. 2 shows a system diagram describing the functionality discussed herein according to illustrative embodiments.

Referring now to FIG. 2, a system diagram describing the functionality discussed herein according to an embodiment of the present invention is shown. It is understood that the teachings recited herein may be practiced within any type of computing environment, including, but not limited to, a networked computing environment (e.g., a cloud computing environment 60). A stand-alone computer system/server 12 is shown in FIG. 2 for illustrative purposes only. In the event the teachings recited herein are practiced in a networked computing environment, each client need not have an IoT public speaking coach engine 60 (hereinafter "system 60"). Rather, all or part of system 60 could be loaded on a server or server-capable device that communicates (e.g., wirelessly) with the clients to provide for delivery of real-time IoT feedback to optimize a public speaking performance. Regardless, as depicted, system 60 is shown within computer system/server 12. In general, system 60 can be implemented as program/utility 40 on computer system 12 of FIG. 1 and can enable the functions recited herein.

Along these lines, system 60 may perform multiple functions similar to a general-purpose computer. Specifically, among other functions, system 60 can improve a spoken presentation of a user in real time using IoT feedback in a networked computing environment. To accomplish this, system 60 can include a set of components (e.g., program modules 42 of FIG. 1) for carrying out embodiments of the present invention. These components can include, but are not limited to, speaking performance data obtainer 62, speaking performance assessor 64, and speaking performance improvement strategizer 66.

Through computer system/server 12, system 60 can receive data 70 captured from one or more sensors 72 (e.g., microphone 74A and/or camera 74B) of a speaking performance of user 80. System 60 can create and maintain (e.g., update) a speaking performance profile of user 82 on computer system/server 12 or any other associated computer system/server. Through computer system/server 12, system 60 can also access oratory and public speaking databases 84, which can include one or more reference speaking performance profiles 86A-C. Through computer system/server 12, system 60 can furthermore deliver a IoT speaking performance strategy 90 to one or more IoT devices 94A-C of an IoT network 92 associated with user 80. These and other features of embodiments of the present invention will be further discussed with reference to FIG. 3 below.

Figure 3:
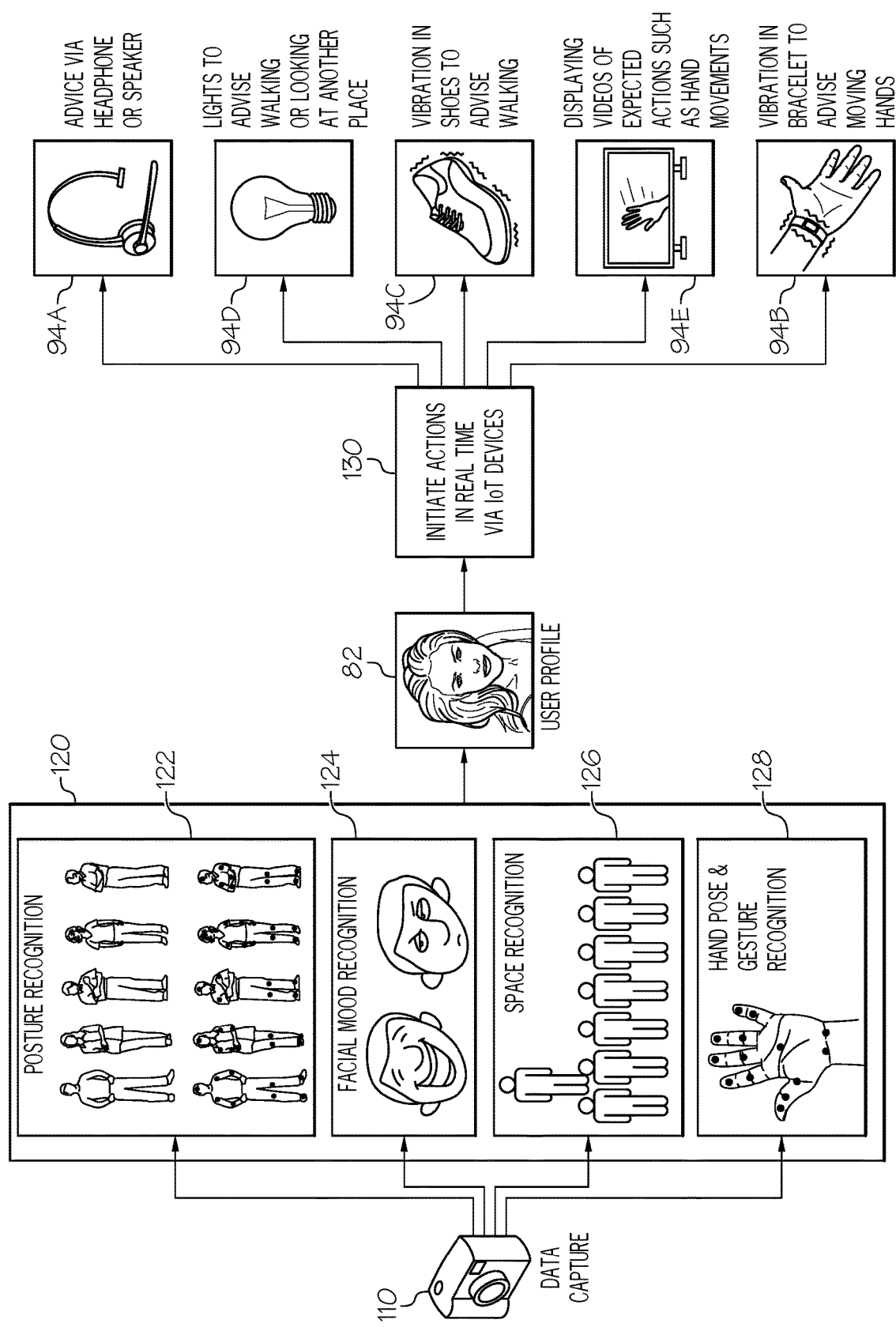
FIG. 3 shows an illustrative embodiment of improving a spoken presentation of a user in real time using IoT feedback according to illustrative embodiments.

Referring now to FIG. 3 in connection with FIG. 2, an illustrative embodiment of improving a spoken presentation of a user in real time using IoT feedback is shown. Speaking performance data obtainer 62 (hereinafter "obtainer 62"), as performed by computer system/server 12, can capture a set of data 70 representative of a speaking performance associated with a user 80 at data capture step 110. To accomplish this, obtainer 62 can receive a live data feed from one or more sensors 72 that monitor user 80, an area around user 80, and/or an audience of user 80. These sensors 72 can include, but are not limited to, visual sensors (e.g., camera 74B), audio sensors (e.g., microphone 74A), motion sensors (e.g., floor pressure sensors, infrared motion sensors, accelerometer sensors on the body of user 80), biological sensors (e.g., sensors that measure a user's blood pressure, pulse/heart rate, and/or temperature), etc. In some embodiments, one or more sensors of sensors 72 can be an IoT device of IoT network 92 associated with user 80. For example, a microphone or camera on a wearable device of IoT network 92, worn by user 80, can be configured to relay captured data 70 to obtainer 62.

Obtainer 62 can obtain a variety of types of data representative of elements of the speaking performance of user 80. For example, in some embodiments, obtainer 62 can capture verbal communication (e.g., from an audio sensor). Verbal communication is the words spoken by user 80 and their meaning as would be interpreted from a transcript of those spoken words. Obtainer 62 can also or alternatively capture non-verbal communication (e.g., from an audio sensor that detects a tone of words spoken by user 80, from a visual or motion sensor that detects actions and a physical presence of user 80, such as pacing or hand movements), such as facial expressions, posture, gestures, appearance, personal space, etc. Non-verbal communication refers to expressions indicated using signals other than words. Such non-verbal communication can include, but is not limited to, body language (kinesics), distance (proxemics), physical environment and appearance, voice (paralanguage), touch (haptics), timing (chronemics), and oculesics (e.g., eye contact, looking while talking, frequency of glances, patterns of fixation, pupil dilation, blink rate, etc.). Obtainer 62 can be configured to take particular note of non-verbal voice/paralanguage communication, as such plays a large role in public speaking. Paralanguage can include, but is not limited to, voice quality, rate, pitch, volume, mood, and speaking style, as well as prosodic features such as rhythm, intonation, and stress.

In some embodiments, obtainer 62 can capture information other than verbal, non-verbal, and paralanguage communication from the public speaking performance of user 80. For example, in some embodiments, obtainer 62 can additionally or alternatively be configured to capture a reaction of an audience to the speaking performance of user 80. Obtainer 62 can obtain non-verbal responses, such as position of eyes (e.g., focused on speaker or on something else), body posture (e.g., attentive or bored), actions (e.g., clapping), from a visual or motion sensor focused on the audience. In some embodiments, other sensors, such as an audio sensor, can be used to detect other non-verbal and verbal audience responses, such as, for example, cheers or interruptions from the audience.

Furthermore, in some embodiments, obtainer 62 can detect a speech topic or presentational goal of user 80. This can be accomplished any number of ways, such as direct input by user 80 prior to the public speaking performance, or machine learning, which determines the topic or goal by analyzing snippets of the content of the speech being given by user 80. In still some other embodiments, obtainer 62 can obtain a profile of user 80 (e.g., inputted by user 80) containing background information (e.g., age, gender, or other demographics) on user 80 that may be used later to determine what public speaking improvement strategies are most applicable to user 80. For instance, a particular age or the presence of a health condition may be used to determine an amount of physical movement to recommend to user 80. For example, if the hand of user 80 is broken, then she will not be instructed to perform hand movements.

Still referring to FIG. 3 in connection with FIG. 2, speaking performance assessor 64 (hereinafter "assessor 64"), as performed by computer system/server 12, can analyze captured data 70 by assigning a set of values to a verbal element of the speaking performance of user 80, a non-verbal element of the speaking performance of user 80, and a paralanguage element of the speaking performance of user 80, to generate a speaking performance profile 82 of user 80 at performance recognition step 120. To accomplish this, assessor 64 can use machine learning techniques to identify features of the real-time speaking performance of user 80, such as non-verbal communication features, and assign those features values (e.g., ratings, such as on a 1-10 scale or percentage) indicative of the user's skills at performing those features and/or indicative of a particular behavior associated with those skills (e.g., a user who over-gesticulates may be assigned a particular code or value, whereas a user who crosses his arms may be assigned a different code or value). In some embodiments, assessor 64 can use posture recognition techniques 122 (e.g., based on existing object recognition techniques) to identify a posture of user 80 and the significance of that posture. For example, assessor 64 may determine from a visual or motion data feed that user 80 is speaking with his arms crossed and his shoulders hunched, indicating discomfort. In some embodiments, additionally or alternatively, assessor 64 can use facial recognition techniques 124 to identify a mood, cognitive state, or feeling of user 80, such as joy, fear, sadness, anger, surprise, or contempt, indicating each with a value (e.g., the user is 45% fearful, 15% angry, and 40% surprised, corresponding with code 123). For example, assessor 64 may determine from a visual data feed that the eyebrows of user 80 are raised, indicating surprise or disbelief. In still some other embodiments, additionally or alternatively, assessor 64 can use space recognition techniques 126 to assess how user 80 occupies and makes use of the space, such as a stage or area around a podium, in which he is speaking. For example, assessor 64 may determine from a visual or motion data feed that user 80 remains in the 20% left most portion of a stage and walks about little, leaving much of the stage space unused (e.g., resulting in a low space utilization value). In some other embodiments, additionally or alternatively, assessor 64 can use hand pose and gesture recognition techniques 128 to identify a meaning, expression, or other significance of gestures or hand placement by user 80, such as exposing palms or keeping hands in pockets or behind one's back. For example, assessor 64 may determine from a visual or motion data feed that user 80 is gesturing with her palms facing outward and her hands low, conveying openness and approachability, and therefore receiving a high hand usage rating, with values indicating the outward facing palms and low hands.

Assessor 64 can use these same posture recognition techniques 122, facial recognition techniques 124, space recognition techniques 126, and hand pose and gesture recognition techniques 128 to analyze a reaction of an audience watching the speaking performance of user 80. For example, assessor 64 can determine that audience members who are slouched in their seats are bored and do not find the speaking performance interesting. In another example, assessor 64 can determine that audience members whose eyes are fixed on the speaking user 80 are engaged in what he is saying. In still another example, assessor 64 can determine that if the audience members form a tight crowd around speaker 80, they are more interested in her speaking performance than if the audience members form a loose crowd, dispersed throughout a room. In yet another example, assessor 64 can analyze actions and gestures (e.g., clapping, thumbs up) made by audience members to gauge a mood of the audience (e.g., happy or unhappy). In some embodiments, assessor 64 can also determine demographics of the audience, such as ages, genders, and likely cultural backgrounds of the audience, which can be used to determine if certain phrases or gestures of user 80 would be considered rude or inappropriate by that audience.

In some embodiments, assessor 64 can use vocal recognition techniques to analyze an audio feed of captured data 70. These vocal recognition techniques can be used to identify paralanguage elements of the speaking performance of user 80, and to assign those elements values (e.g., ratings, such as on a 1-10 scale or percentage) indicative of the user's skills at performing those elements and/or indicative of a particular behavior associated with those elements (e.g., a user who is mumbling may be assigned a particular code or value, whereas a user who has an uneven speaking cadence may be assigned a different code or value). Paralanguage elements of the speaking performance of user 80 can include, but are not limited to, voice quality (e.g., clear, mumbled), rate (e.g., fast, walking-speed, slow), pitch (e.g., higher or lower than normal for user 80), volume (e.g., sufficiently loud to be heard by all audience members, or not), mood (e.g., positive, angry, hopeful), rhythm (e.g., smooth, halting), intonation (e.g., inflections), stress (e.g., choice of words emphasized), and other elements of speaking style.

The vocal recognition techniques can also be used to parse the meaning (i.e., definition) of words spoken by user 80 or a transcript of these words. In some embodiments, assessor 64 can associate the parsed/transcribed words with a reaction of the audience to those words, and thereby determine public speaking content that is received favorably or unfavorably by the audience. Assessor 64 can assign values to parsed/transcribed words based on an audience reaction to the words or to a known connotation of the words, such as found in a dictionary or other reference resource. Assessor 64 can also assign ratings or other values for phrases spoken by user 80. This may be accomplished by generating a conglomerate score for the phrase based on values of words therein contained, an audience reaction to the phrase, or a known connotation of the phrase, such as found in a dictionary or other reference resource. In some further embodiments, assessor 64 can weight particular words or phrases spoken by user 80 based on recognized non-verbal or paralanguage behavior accompanying a word or phrase. For example, a word or phrase that is accompanied by stressing the word or a sharp hand movement, or a dramatic pause after the word or phrase, can be assigned a more weighted value than a transitory word accompanied by none of these.

In some embodiments, assessor 64 can also analyze a data feed from a biologic sensor monitoring a physical condition of user 80. For example, assessor 64 can determine that any of blood pressure, heart rate, and/or temperature of user 80 is above or below normal. Assessor 64 can compare such readings to known biological readings (such as data charts) to determine a physical condition of user 80 indicated by the reading. For example, an elevated pulse may be indicative of a nervous state, or a low blood pressure may be indicative of lightheadedness.

According to embodiments of the present invention, assessor 64 can generate a speaking performance profile 82 of user 80. In some embodiments, this speaking performance profile 82 can include two components, a first profile containing verbal, non-verbal, and paralanguage elements (e.g., values indicative of the speaking performance) of the present speaking performance of user 80, and a second profile containing historic and learned data on user 80. In the present speaking performance portion of profile 82, assessor 64 can enter elements of the present speaking performance of user 80 as determined by assessor 64 from captured data 70, as described above. The present speaking performance portion of profile 82 is representative of the speaking performance of user 80, and can contain, but is not limited to, an analysis of the verbal communication (i.e., a transcript of words spoken, values for their meaning or connotation), non-verbal communication (e.g., values describing user posture, mood, use of space, and gestures), and paralanguage communication (e.g., values describing voice quality, rate, pitch, volume, mood, rhythm, intonation, stress, and speaking style) of user 80, as well as, for example, an audience reaction to user 80. In some embodiments, the present speaking performance portion of profile 82 can also include other elements of the speaking performance of user 80, such as a topic of speech (e.g., the importance of fighting pediatric diseases) or a goal of the speaking performance (e.g., encouraging an audience to donate to a charity).

The historic and learned data portion of speaking performance profile 82 can contain historic information on user 80 from past public speaking performances. This can include analyses of verbal (i.e., a transcript of words spoken, values for their meaning or connotation), non-verbal (e.g., values describing user posture, mood, use of space, and gestures), and paralanguage (e.g., values describing voice quality, rate, pitch, volume, mood, rhythm, intonation, stress, and speaking style) communication of user 80 at previous speaking performances, as well as, for example, an audience reaction to user 80 at those speaking performances. Speaking performance profile 82 can also include background information (e.g., age, gender, or other demographics) on user 80, as well as characteristics, such as personality and level of public speaking comfort. Speaking performance profile 82 can also include information on previous successful or unsuccessful real-time IoT feedback strategies, such as to which strategies or IoT devices user 80 is most/best responsive, areas of public speaking in which user 80 is attempting to improve (e.g., an area that user 80 has indicated he would like to focus), public speaking strengths or weaknesses of user 80, etc.

It should also be noted that, in some embodiments, in cases where two or more people are speaking to one another, assessor 64 can generate a speaking performance profile 82 for each of the speakers. These multiple profiles can be used to determine how each person reacts to other people in the conversation and these reactions can be added to both the profile of the speaker and the profile of the reactor.

Assessor 64, as performed by computer system/server 12, can compare speaking performance profile 82 of user 80 to a reference speaking performance profile 86A-C having a set of values that indicate an optimal verbal speaking performance, non-verbal speaking performance, and paralanguage speaking performance for user 80. System 60 can learn desirable and/or undesirable public speaking performance behaviors from past cohorts of users classified by public speaking behaviors stored in oratory and public speaking databases 84 or any other reference database. These classified public speaking behaviors can include particular speaking performance difficulties or conditions, and their corresponding values, and ameliorative acts to cure such difficulties or conditions. Oratory and public speaking databases 84 can also contain values for content such as best speaking practices, meanings of particular motions and actions, and even videos illustrating such motions and actions. Based on one or more reference profiles 86A-C, assessor 64 can create, or access a preexisting, baseline optimal/ideal speaking performance with which to compare the present speaking performance of user 80 in his/her speaking performance profile 82.

When selecting profiles 86A-C to use as reference/baseline comparisons, assessor 64 can search for profiles that have similar or otherwise related topics of speech and/or speaking goals, to better compare the speaking performance of user 80 to a same type of speaking performance. For example, a speaking performance profile 82 for a speech at a wedding reception would be compared with profiles from other festive/celebratory speeches, while a speaking performance profile 82 for a business plan presentation would be compared with profiles from other business and workplace presentations.

In some embodiments, assessor 64 can add new speaking performance profiles to oratory and public speaking databases 84 as system 60 encounters new users and their speaking performances. Assessor 64 can use machine learning techniques, as described above, to analyze and learn from these added speaking performance profiles to better tailor analyses and recommendations to subsequent speaking performance profiles.

Figure 4:
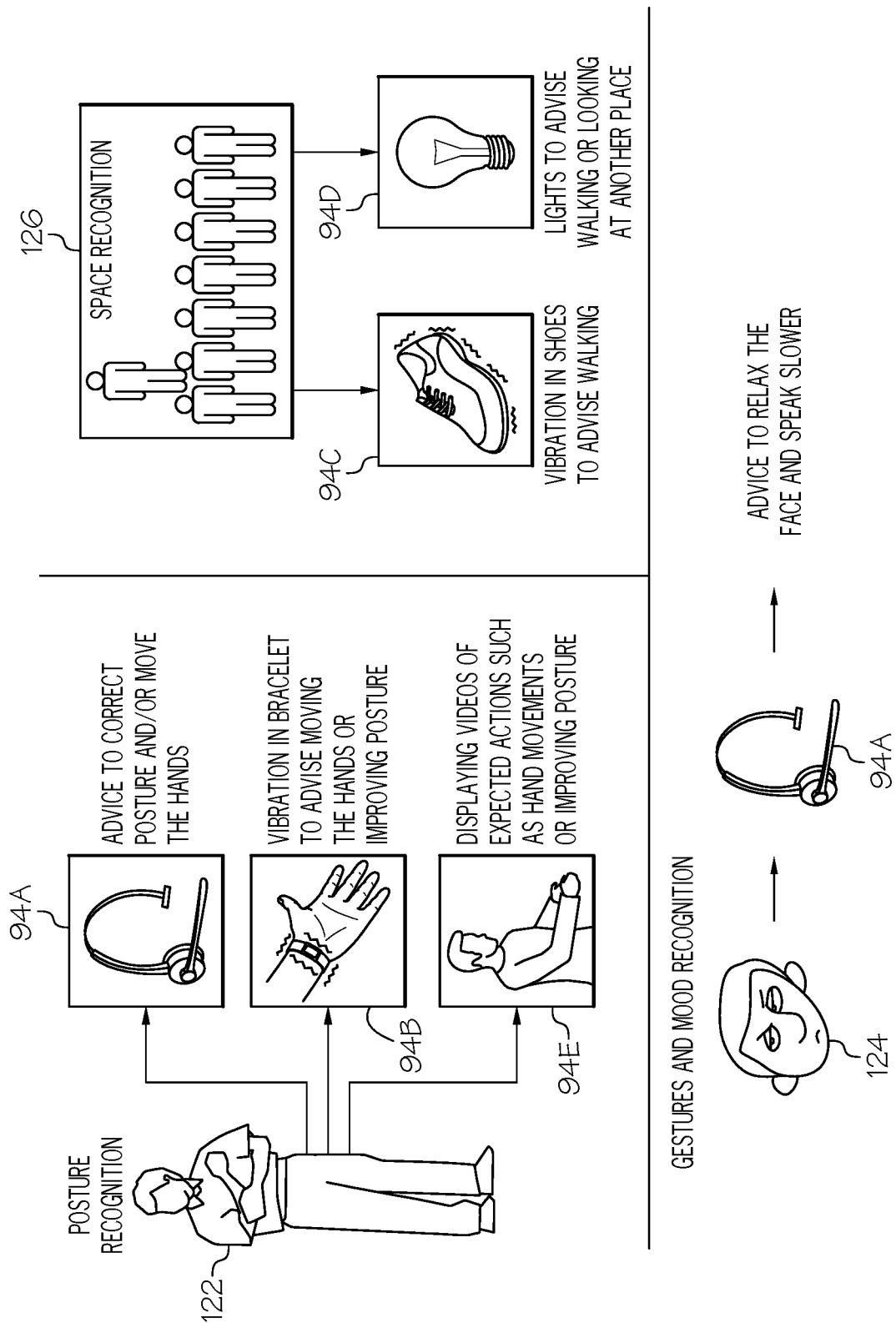
FIG. 4 shows a set of illustrative examples of real-time IoT improvement strategies according to illustrative embodiments.

Referring now to FIG. 4 in connection with FIG. 2 and FIG. 3, a set of illustrative examples of real-time IoT improvement strategies is shown. Speaking performance improvement strategizer 66 (hereinafter "strategizer 66"), as performed by computer system/server 12, can generate, based on the comparison of speaking performance profile 82 of user 80 to reference speaking performance profiles 86A-C, a set of performance improvement strategies 90 for user 80. To accomplish this, strategizer 66 can identify differences between the present speaking performance of user 80 described in speaking performance profile of user 82 and reference speaking performances 86A-C. Strategizer 66 can extrapolate from these differences one or more actions that user 80 should take to improve his or her speaking performance. From these identified actions, strategizer 66 can create one or more strategies for enhancing the public speaking skills of user 80 by triggering actions on IoT devices 94A-E of IoT network 92 of user 80, such as movements, sounds, and visuals.

For example, in response to recognition of a poor posture with crossed arms of user 80, strategizer 66 can develop an IoT-based strategy to cause user 80 to move his arms and stand straighter. This IoT-based strategy can include advising user 80 to correct his posture and move his hands through headphone IoT device 94A. Alternatively or additionally, this IoT-based strategy can include actuating a vibration in bracelet/watch IoT device 94B to cause user 80 to move his arms or a vibration in a microphone battery/power pack with IoT device features at the back of user 80 to remind him to stand up straight. Furthermore, alternatively or additionally, this IoT-based strategy can include displaying a video of expected actions, such as hand movements or better posture, on a video display device 94E, such as a teleprompter display device.

In another example, in response to recognition of poor space usage by user 80 as she performs her public speaking performance, strategizer 66 can develop an IoT-based strategy to cause user 80 to move about the space available to her. This IoT-based strategy can include advising user 80 to walk by triggering a haptic actuator in a smart shoe 94C (an IoT wearable device) or by causing an array of lighted IoT devices 94D to signal a path user 80 should walk or a place user 80 should focus her eyes.

In still another in response to recognition of an anxious or nervous mood of user 80, strategizer 66 can develop an IoT-based strategy to assist user 80 in feeling more calm. This IoT-based strategy can include advising user 80 to relax his face and speak more slowly through headphone IoT device 94A. Alternatively or additionally, this IoT-based strategy can include playing a slow pulse through headphone IoT device 94A or a haptic actuator of bracelet/watch IoT device 94B to assist in slowing speech and restoring a sense of calm.

Strategizer 66 can generate any number of performance improvement strategies 90 for user 80 using any IoT device now known or later developed. Such performance improvement strategies 90 using IoT devices can include, but are not limited to using actuators to perform motions, playing sounds, visuals, videos, music, voices, or other emissions of noise, projecting lights/patterns on a wall or other surface, emitting scents, causing vibrations, or other action that can be configured to support a public speaking performance by user 80.

Still referring to FIG. 2, FIG. 3, and FIG. 4, strategizer 66, as performed by computer system/server 12, can select a performance improvement strategy from the set of performance improvement strategies based on an identification of an availability of a set of IoT devices 94A-E for delivery of at least one of the set of performance improvement strategies. Strategizer 66 can send a communication to IoT network 92 or any IoT devices 94A-E in IoT network 92, requesting the return of an inventory or other device identifying information to determine what IoT devices 94A-E are presently available for use by strategizer 66 to communicate IoT speaking performance strategy 90 to user 80. Strategizer 66 can obtain this identifying information from a return communication from IoT network 92, or by any other means now known or presently developed. Based on which IoT devices 94A-E are available, strategizer 66 can identify which of generated IoT speaking performance strategies 90 are capable of implementation and which are not.

From the IoT speaking performance strategies 90 capable of implementation, strategizer 66 can select one or more strategies to present to user 80.

This selection can be based on a number of factors, such as, but not limited to, a historic preference of user 80 for IoT strategies that use a particular IoT device or an aggregate user preference for IoT strategies that use a particular IoT device. This preference can be expressed as a ranking of IoT devices for training particular public speaking performance skills. For example, if a user has responded promptly to a vibration in bracelet/watch IoT device 94B with an uncrossing of her arms, than that signal may be desirable to use again in the case that the user is crossing her arms. Another factor that the selection can be based on is severity of a speaking performance problem or an area that has been identified as needing improvement. For example, if user 80 appears very nervous and is only making limited use of his presentation space, strategizer 66 can select an IoT strategy that focuses on helping user 80 to feel less nervous, as opposed to a strategy that advises user 80 to move about more. It should be understood, however, that in some embodiments, strategizer 66 can select two or more IoT speaking performance strategies 90 to implement essentially simultaneously.

Strategizer 66, as performed by computer system/server 12, can communicate, responsive to the captured speaking performance associated with user 80, instructions to deliver selected performance improvement strategy 90 to user 80 through an output user interface of available IoT device 94A-E during the speaking performance at strategy implementation step 130. This allows IoT speaking performance strategy 90 to be implemented in real time, as user 80 is speaking. Therefore, as deficiencies are recognized in the speaking performance of user 80, strategizer 66 can provide user 80 with an ameliorative or otherwise enhancing action to correct the deficiency moving forward in the speaking performance.

In some embodiments of the present invention, obtainer 62, as performed by computer system/server 12, can detect a response of user 80 to the delivery of selected performance improvement strategy 90 through the output user interface of the available IoT device 94A-E during the speaking performance, and assessor 64, as performed by computer system/server 12, can add the detected user response to selected performance improvement strategy 90 to speaking performance profile 82 of user 80. In this manner, system 60 can learn from user 80 which performance improvement strategies and IoT devices user 80 reacts best or worse to and, therefore, which performance improvement strategies are optimal to present to user 80. These detected user responses can be added to speaking performance profile 82 as historical data on user 80. In some embodiments, system 60 can also save the detected user response to selected performance improvement strategy 90 to public speaking databases 84, to use as a reference against other users. In some embodiments, a recording of the speaking performance of user 84 can be saved to public speaking databases 84 for further analysis.

In addition to learning which strategies work best for user 80, system 60 can also learn when best to present a performance improvement strategy 90 to user 80 (e.g., when user 80 is taking a sip of water) to prevent interrupting the flow of the speaking performance of user 80. For example, if presenting a performance improvement strategy 90 appears to have caused user 80 to lose his placement or train of thought, system 60 can search for a natural pause during which to present subsequent performance improvement strategies 90. Furthermore, in the case that present performance improvement strategy 90 causes user 80 to lose her placement or train of thought, strategizer 66 can instruct an IoT device 94A-E to implement a strategy to return user 80 to her lost placement, such as displaying a transcript on video display device 94E of the last words spoken by user 80, or playing the words back over headphone IoT device 94A.

In some embodiments, in cases where assessor 64 determines that user 80 is unresponsive to or did not respond as intended to selected performance improvement strategy 90, strategizer 66 can rank available performance improvement strategies 90 for user 80 according to a historic effectiveness of each of strategies 90. Strategizer 66 can then communicate, responsive to the detected response of user 80 to the delivery of the selected performance improvement strategy 90 being a negative response, instructions to deliver a next best performance improvement strategy 90 (according to the ranking) to one of the available IoT devices 94A-E during the speaking performance. This permits system 60 to implement fallback performance improvement strategies in the case that user 80 fails to understand the performance improvement strategy communicated through an IoT device 94A-E or the action of IoT device 94A-E fails to elicit the desired response.

In some embodiments of the present invention, system 60 can be used as a public speaking performance training tool with which a user can practice speaking performance scenarios without an audience. System 60, as performed by computer system/server 12, can generate a public speaking performance scenario having a set of parameter constraints and communicate this public speaking performance scenario to user 80. System 60 can then monitor the public speaking performance of user 80 under the set of parameter constraints. For example, system 60 may inform user 80 that she is speaking to a large room of people or that the audience is not paying attention to her. Based on such a scenario, strategizer 66 can then guide user 80 through performance improvement strategies 90 to address such a scenario. In another example, system 60 may prompt user 80 to pause his speaking performance and practice a particular public speaking skill, such as hand movements. In still other examples, system 60 may present user 80 with an emergency drill scenario, in which something has gone wrong or is less than ideal in the speaking performance, such as a microphone that is not working, a presentation area with limited space, or a question and answer session, which may or may not be related to the topic of discussion. In each of these "drill" scenarios, system 60 can challenge user 80 to attempt to continue the speaking performance under the "emergency" scenario, while monitoring the speaking performance of user 80. In some embodiments, strategizer 66 can be configured to provide user 80 with any needed guidance to navigate through the emergency drill scenario.

Figure 5:
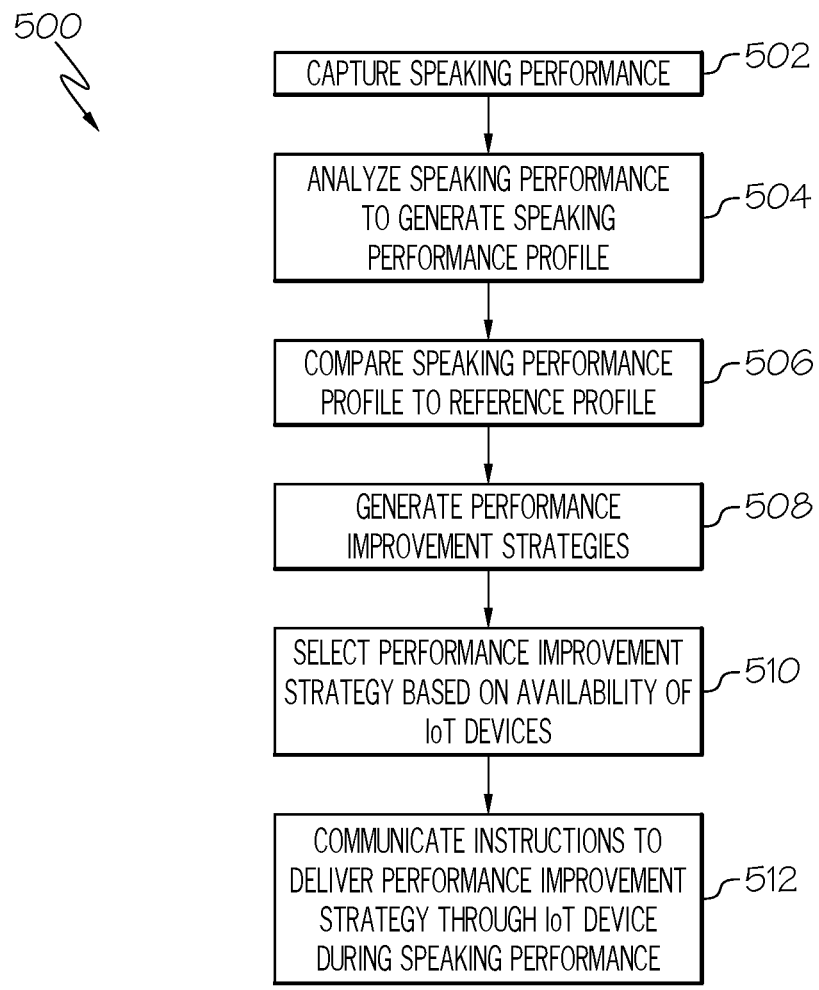
FIG. 5 shows a process flowchart for improving a spoken presentation of a user in real time using IoT feedback according to illustrative embodiments.

As depicted in FIG. 5, in one embodiment, a system (e.g., computer system/server 12) carries out the methodologies disclosed herein. Shown is a process flowchart 500 for improving a spoken presentation of a user in real time using IoT feedback. At 502, speaking performance data obtainer 62 captures a set of data 70 representative of a speaking performance associated with a user 80. At 504, speaking performance assessor 64 analyzes the captured data 70 by assigning a set of values to a verbal element of the speaking performance of user 80, a non-verbal element of the speaking performance of user 80, and a paralanguage element of the speaking performance of user 80, to generate a speaking performance profile 82 of the user 80. At 506, speaking performance assessor 64 compares the speaking performance profile 82 of the user 80 to a reference speaking performance profile 86A-C having a set of values that indicate an optimal verbal speaking performance, non-verbal speaking performance, and paralanguage speaking performance for user 80. At 508, speaking performance improvement strategizer 66 generates, based on the comparison, a set of performance improvement strategies 90 for the user 80. At 510, speaking performance improvement strategizer 66 selects a performance improvement strategy 90 from the set of performance improvement strategies 90 based on an identification of an availability of a set of IoT devices 94A-E for delivery of at least one of the set of performance improvement strategies 9. At 512, speaking performance improvement strategizer 66 communicates, responsive to the captured speaking performance associated with the user 80, instructions to deliver the selected performance improvement strategy 90 to the user 80 through an output user interface of the available IoT device 94 A-C during the speaking performance.

Process flowchart 500 of FIG. 5 illustrates the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for improving a spoken presentation of a user in real time using IoT feedback. Thus, embodiments herein disclose a process for supporting computer infrastructure, comprising integrating, hosting, maintaining, and deploying computer-readable code into a computing system (e.g., computer system/server 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for improving a spoken presentation of a user in real time using IoT feedback. In this case, the service provider can create, maintain, support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is apparent that there has been provided herein approaches to improve a spoken presentation of a user in real time using IoT feedback. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A method for improving a spoken presentation of a user in real time using internet of things (IoT) feedback, the method comprising:
   capturing a set of data representative of a speaking performance associated with a user, the captured set of data including an audience reaction to the speaking performance;
   analyzing snippets of a content of the speaking performance to determine an audience reaction goal of the speaking performance;
   analyzing the captured data by assigning a set of values to a verbal element of the speaking performance of the user, a non-verbal element of the speaking performance of the user, and a paralanguage element of the speaking performance of the user, and by assigning a set of values, which indicate a connotation of the public speaking performance to the audience, to a verbal element, a non-verbal element, and a paralanguage element of the audience reaction to the speaking performance, to generate a speaking performance profile of the user;
   comparing the speaking performance profile of the user to a reference speaking performance profile having a set of values that indicate an optimal verbal speaking performance, non-verbal speaking performance, paralanguage speaking performance, and audience reaction for the user for the determined audience reaction goal of the speaking performance;
   generating, based on the comparison, a set of performance improvement strategies for the user;
   selecting a performance improvement strategy from the set of performance improvement strategies based on an identification of an availability of a set of IoT devices for delivery of at least one of the set of performance improvement strategies; and
   communicating, responsive to the captured speaking performance associated with the user, instructions to deliver the selected performance improvement strategy to the user through an output user interface of the available IoT device during the speaking performance.

2. The method of claim 1, the method further comprising:
   detecting a response of the user to the delivery of the selected performance improvement strategy through the output user interface of the available IoT device during the speaking performance; and
   adding the detected user response to the selected performance improvement strategy to the speaking performance profile of the user.

3. The method of claim 2, the method further comprising:
   ranking the available set of performance improvement strategies for the user according to a historic effectiveness of each of the set of performance improvement strategies; and
   communicating, responsive to the detected response of the user to the delivery of the selected performance improvement strategy being a negative response, instructions to deliver a next best performance improvement strategy according to the ranking to one of the available IoT devices during the speaking performance.

4. The method of claim 1, the method further comprising:
   detecting an audience reaction to the speaking performance associated with the user; and generating the speaking performance profile of the user based on the detected audience reaction.

5. The method of claim 1, wherein the set of data comprises video, audio, or sensor data,
wherein the verbal element of the speaking performance comprises a verbal element selected from the group consisting of: a spoken word, and a spoken word meaning;
wherein the non-verbal element of the speaking performance comprises a non-verbal element selected from the group consisting of: posture, mood, use of space, and gestures, and
wherein the paralanguage element of the speaking performance comprises a paralanguage element selected from the group consisting of: voice quality, voice rate, voice pitch, voice volume, mood, voice rhythm, voice intonation, stress, and speaking style.

6. The method of claim 1, wherein at least one of the set of performance improvement strategies comprises a prompt, performable by an IoT device, for the user to perform a designated action, and wherein at least one of the set of IoT devices is a device selected from the group consisting of: an audio-playing IoT device, a light display IoT device, a haptic IoT device, and a display screen IoT device.

7. The method of claim 1, the method further comprising:
generating a public speaking performance scenario having a set of parameter constraints;
communicating the public speaking performance scenario to the user; and
monitoring the public speaking performance of the user under the set of parameter constraints.

8. The method of claim 1, the method further comprising using a machine learning algorithm to generate the speaking performance profile of the user based on previous speaking performance interactions of the user with IoT devices delivering performance improvement strategies.

9. A computer system for improving a spoken presentation of a user in real time using internet of things (IoT) feedback, the computer system comprising:
a memory medium comprising program instructions;
a bus coupled to the memory medium; and
a processor, for executing the program instructions, coupled to an IoT public speaking coach engine via the bus that when executing the program instructions causes the system to:
capture a set of data representative of a speaking performance associated with a user, the captured set of data including an audience reaction to the speaking performance;
analyze snippets of a content of the speaking performance to determine an audience reaction goal of the speaking performance;
analyze the captured data by assigning a set of values to a verbal element of the speaking performance of the user, a non-verbal element of the speaking performance of the user, and a paralanguage element of the speaking performance of the user, and by assigning a set of values, which indicate a connotation of the public speaking performance to the audience, to a verbal element, a non-verbal element, and a paralanguage element of the audience reaction to the speaking performance, to generate a speaking performance profile of the user;
compare the speaking performance profile of the user to a reference speaking performance profile having a set of values that indicate an optimal verbal speaking performance, non-verbal speaking performance, paralanguage speaking performance, and audience reaction for the user for the determined audience reaction goal of the speaking performance;
generate, based on the comparison, a set of performance improvement strategies for the user;
select a performance improvement strategy from the set of performance improvement strategies based on an identification of an availability of a set of IoT devices for delivery of at least one of the set of performance improvement strategies; and
communicate, responsive to the captured speaking performance associated with the user, instructions to deliver the selected performance improvement strategy to the user through an output user interface of the available IoT device during the speaking performance.

10. The computer system of claim 9, the instructions further causing the system to:
detect a response of the user to the delivery of the selected performance improvement strategy through the output user interface of the available IoT device during the speaking performance; and
add the detected user response to the selected performance improvement strategy to the speaking performance profile of the user.

11. The computer system of claim 10, the instructions further causing the system to:
rank the available set of performance improvement strategies for the user according to a historic effectiveness of each of the set of performance improvement strategies; and
communicate, responsive to the detected response of the user to the delivery of the selected performance improvement strategy being a negative response, instructions to deliver a next best performance improvement strategy according to the ranking to one of the available IoT devices during the speaking performance.

12. The computer system of claim 9, the instructions further causing the system to:
detect an audience reaction to the speaking performance associated with the user; and
generate the speaking performance profile of the user based on the detected audience reaction.

13. The computer system of claim 9, wherein the set of data comprises video, audio, or sensor data,
wherein the verbal element of the speaking performance comprises a verbal element selected from the group consisting of: a spoken word, and a spoken word meaning;
wherein the non-verbal element of the speaking performance comprises a non-verbal element selected from the group consisting of: posture, mood, use of space, and gestures, and
wherein the paralanguage element of the speaking performance comprises a paralanguage element selected from the group consisting of: voice quality, voice rate, voice pitch, voice volume, mood, voice rhythm, voice intonation, stress, and speaking style.

14. The computer system of claim 9, wherein at least one of the set of performance improvement strategies comprises a prompt, performable by an IoT device, for the user to perform a designated action, and wherein at least one of the set of IoT devices is a device selected from the group consisting of: an audio-playing IoT device, a light display IoT device, a haptic IoT device, and a display screen IoT device.

15. The computer system of claim 9, the instructions further causing the system to:
- generate a public speaking performance scenario having a set of parameter constraints;
- communicate the public speaking performance scenario to the user; and
- monitor the public speaking performance of the user under the set of parameter constraints.

16. The computer system of claim 9, the instructions further causing the system to use a machine learning algorithm to generate the speaking performance profile of the user based on previous speaking performance interactions of the user with IoT devices delivering performance improvement strategies.

17. A computer program product for improving a spoken presentation of a user in real time using internet of things (IoT) feedback, the computer program product comprising a computer readable hardware storage device, and program instructions stored on the computer readable hardware storage device, to:
- capture a set of data representative of a speaking performance associated with a user, the captured set of data including an audience reaction to the speaking performance;
- analyze snippets of a content of the speaking performance to determine an audience reaction goal of the speaking performance;
- analyze the captured data by assigning a set of values to a verbal element of the speaking performance of the user, a non-verbal element of the speaking performance of the user, and a paralanguage element of the speaking performance of the user, and by assigning a set of values, which indicate a connotation of the public speaking performance to the audience, to a verbal element, a non-verbal element, and a paralanguage element of the audience reaction to the speaking performance, to generate a speaking performance profile of the user;
- compare the speaking performance profile of the user to a reference speaking performance profile having a set of values that indicate an optimal verbal speaking performance, non-verbal speaking performance, paralanguage speaking performance, and audience reaction for the user for the determined audience reaction goal of the speaking performance;
- generate, based on the comparison, a set of performance improvement strategies for the user;
- select a performance improvement strategy from the set of performance improvement strategies based on an identification of an availability of a set of IoT devices for delivery of at least one of the set of performance improvement strategies; and
- communicate, responsive to the captured speaking performance associated with the user, instructions to deliver the selected performance improvement strategy to the user through an output user interface of the available IoT device during the speaking performance.

18. The computer program product of claim 17, the computer readable storage device further comprising instructions to:
- rank the available set of performance improvement strategies for the user according to a historic effectiveness of each of the set of performance improvement strategies;
- detect a response of the user to the delivery of the selected performance improvement strategy through the output user interface of the available IoT device during the speaking performance;
- add the detected user response to the selected performance improvement strategy to the speaking performance profile of the user; and
- communicate, responsive to the detected response of the user to the delivery of the selected performance improvement strategy being a negative response, instructions to deliver a next best performance improvement strategy according to the ranking to one of the available IoT devices during the speaking performance.

19. The computer program product of claim 17, the computer readable storage device further comprising instructions to:
- generate a public speaking performance scenario having a set of parameter constraints;
- communicate the public speaking performance scenario to the user; and
- monitor the public speaking performance of the user under the set of parameter constraints.

20. The computer program product of claim 17, the computer readable storage device further comprising instructions to use a machine learning algorithm to generate the speaking performance profile of the user based on previous speaking performance interactions of the user with IoT devices delivering performance improvement strategies.

* * * * *